Patented June 25, 1946

2,402,686

UNITED STATES PATENT OFFICE 2,402,686

HYDROGENATION OF ARYL SULPHIDES AND PRODUCTS RESULTING

Frank Kerr Signaigo, Wilmington, Del., assignor to E. I. du Pont de Nemours & Company, Wilmington, Del., a corporation of Delaware No Drawing. Application April 13, 1940, Serial No. 329,582

38 Claims. (Cl. 260—609)

This invention relates to catalytic hydrogenations and, more particularly, to the hydrogenation of aryl sulphides to thiophenols.

Prior to this invention it was generally regarded impractical to consider the use of catalytic hydrogenation in connection with the reduction of sulphur compounds, particularly aryl sulphides which are widely recognized as poisons for the usual hydrogenation catalysts. Thiophenols have been prepared by (a) energetic reduction of the corresponding aryl sulphonechlorides, e. g., with zinc and sulphuric acid solution, (b) the action of phosphorus pentasulphide on phenols, and (c) converting a diazonium salt to a xanthate ester followed by alkali decomposition. All of these methods involve high reagent consumption, the desired thiophenol is difficult to isolate in a pure form, and in many cases the yields are indifferent. These disadvantages hinder the economical preparation of thiophenols in commercial quantities by these methods.

It is accordingly an object of this invention to provide an easily controllable, economic method for preparing thiophenols in high yields. It is a further object to provide a catalytic method for preparing thiophenols from aryl sulphides. It is another object to provide a method for preparing thiophenols which is adaptable to large-scale operation. Other objects will be apparent from the following description of this invention.

These objects are accomplished by the following invention which comprises reacting an aryl sulphide, especially one in which the aromatic nuclei are separated by at least two sulphur atoms in contiguous relation with hydrogen in the presence of a sulphactive hydrogenation catalyst at a temperature below 300° C.

In practicing this invention the aryl sulphide dissolved in a suitable solvent is heated with agitation in an autoclave with hydrogen at superatmospheric pressure, in the presence of a metal sulphide catalyst, until no further absorption of hydrogen occurs. Thereafter, the contents of the autoclave are filtered to separate the catalyst and subjected to distillation to separate the thiophenol from the solvent. The transformations occurring during this process may be represented by the following sample equations.

$$R-S-S-R + H_2 \longrightarrow 2R-SH$$

$$R-S-S-S-R + 2H_2 \longrightarrow 2R-SH + H_2S$$

$$R-S-S_x-S-R + (x+1)H_2 \longrightarrow 2R-SH + xH_2S$$

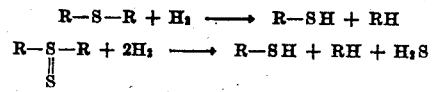

$$R-S-R + H_2 \longrightarrow R-SH + RH$$

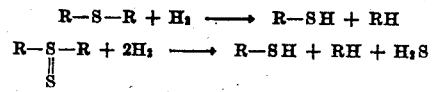

The exact manner of practicing this invention will vary depending upon the particular aryl sulphides to be reduced. A more detailed description of the practice of this invention is given by the following examples. The amounts of materials referred to are given in parts by weight unless otherwise specified.

Example I

Ninety-six parts of diphenyl disulphide dissolved in 75 parts of dioxane was charged into a high pressure autoclave together with 15 parts of a cobalt sulphide catalyst prepared by precipitation of cobalt chloride with sodium polysulphide. Hydrogen was charged into the autoclave to a pressure of 2,500 lbs. per sq. in. pressure and the autoclave was heated to 125° C. while being agitated. Rapid absorption of hydrogen occurred and the pressure decreased 400 lbs. per sq. in. in 15 minutes. No further hydrogen absorption occurred, indicating that the reaction was complete. After filtering the contents of the autoclave from the catalyst, the dioxane solution of the product was boiled to remove any hydrogen sulphide formed by reduction of the catalyst. Titration of an aliquot sample with standard iodine indicated the presence of 97 parts of thiophenol. This amount corresponded to the quantitative conversion of diphenyl disulphide to thiophenol. The dioxane solvent was removed by distillation yielding pure thiophenol, B. P. 73 to 74°/29 mm.

Example II

A crude mixture (127 parts) of mono-, di-, and polysulphides of xylene, obtained by the reaction of xylene with sulphur chloride in the presence of zinc chloride, was dissolved in xylene and charged into an autoclave, together with 7 parts of a cobalt sulphide catalyst prepared by precipitating cobalt nitrate with sodium trisulphide. Hydrogen was charged into the autoclave to a pressure of 1,200 lbs. per sq. in. and the autoclave heated with suitable agitation to a temperature of 150° C. At this temperature the absorption of hydrogen commenced and after 2.5 hours the pressure had decreased 500 lbs. per sq. in. The autoclave was then cooled and the contents were filtered from the catalyst. The product was distilled to separate hydrogen sulphide and the xylene solvent. In this way there was obtained 120 parts of a liquid mixture of thioxylenols and xylyl sulphides which by titration with standard iodine was found to contain 62% of thioxylenols. Distillation of this product yielded a fraction boiling at 97° C./30 mm. which analyzed for thioxylenol. The remainder of the product was a viscous oil which contained thiols of higher molecular weight.

*Example III*

A mixture of 75 parts of crude toluene sulphides prepared by reacting sulphur chloride with toluene in the presence of ferric chloride was dissolved in toluene and charged into a hydrogenation autoclave, together with 7 parts of a precipitated nickel polysulphide catalyst. Hydrogen was then forced into the autoclave to a pressure of 1600 lbs. per sq. in. and the autoclave heated to 150° C. with agitation. At this temperature the pressure began to decrease, indicating that reaction was occurring. After one-half hour the pressure had decreased by 700 lbs. per sq. in., and on further heating no additional hydrogen absorption was noted. After removal of the catalyst and toluene solvent from the product there was obtained a liquid mixture of thiocresols and tolyl sulphides. Titration of a sample with standard iodine indicated the presence of 39 parts of thiocresols. Distillation of this product yielded 35 parts of thiocresol, boiling at 93° to 94° C./30 mm. The nonvolatile distillation residue also contained thiols.

*Example IV*

One hundred twenty-one parts of naphthalene sulphides containing 28% of sulphur obtained by the reaction of naphthalene with sulphur chloride in the presence of zinc chloride was dissolved in 90 parts of benzene and charged into an autoclave together with 10 parts of molybdenum sulphide catalyst prepared by heating ammonium thiomolybdate. The autoclave was agitated and heated to 150° C. under a hydrogen pressure of 500 lbs. per sq. in. After three hours hydrogen absorption had ceased, and the reaction was complete. The contents of the autoclave were filtered to separate the catalyst, and the benzene, together with the hydrogen sulphide formed, removed by distillation under diminished pressure. The product, a light yellow oil, was obtained in the amount of 108 parts. Titration of a sample with standard iodine indicated the product to contain 56% of thionaphthols. Distillation of this material yielded 57 parts of pure thio-alpha-naphthol, B. P. 105° to 106°/1.5 mm., containing 20% of thiol sulphur.

The above experiment was repeated under exactly the same conditions except that cobalt, nickel, and iron sulphactive catalysts were employed at varying temperatures. The cobalt sulphide was prepared by reducing precipitated cobalt polysulphide with hydrogen at 100° to 200° C. The nickel catalyst was prepared by reducing precipitated nickel carbonate-on-kieselguhr with hydrogen at 450° to 475° C., and stabilizing the cooled pyrophoric product by exposure to air under conditions such that the temperature of the mass did not exceed 50° C. The pyrophoric iron was obtained by extracting the aluminum from a finely ground alloy of equal weights of iron and aluminum with boiling sodium hydroxide solution. When exposed to the action of sulphur, hydrogen sulphide, or organic sulphur compounds, the finely divided metals are converted in part to sulphides which possess sulph-active properties and, accordingly, an equivalent amount of sulphur was charged with the metals to effect the conversion of the active metal sulphide in the hydrogenation autoclave. The following table gives the temperatures reaction times and per cent of thionaphthols in the hydrogenated products:

| Catalyst | Hydrogenation temperature | Duration of hydrogen absorption | Thionaphthols in product |
|---|---|---|---|
|  | °C. | Hours | Per cent |
| Cobalt sulphide | 100 | 3.5 | 56 |
| Nickel-on-kieselguhr (sulphurized) | 150 | 3.0 | 55 |
| Iron (pyrophoric) (sulphurized) | 175 | 3.0 | 58 |

*Example V*

A mixture of crude sulphides of biphenyl containing substantial proportions of poly- and disulphides obtained by the reaction of biphenyl with sulphur monochloride in the presence of zinc chloride was dissolved in benzene and charged into an autoclave with 10% of finely divided pyrophoric iron and enough free sulphur to convert the iron to iron sulphide. The autoclave was agitated and heated to 175° C. under 1500 lbs. per sq. in. hydrogen pressure. During 3.5 hours heating the pressure decreased 550 lbs. per sq. in. and thereafter no further absorption of hydrogen was noted. After filtering off the catalyst from the reaction mixture, the benzene solvent and hydrogen sulphide were separated by distillation, leaving a yellow solid residue of a mixture of biphenyl monosulphides and phenyl thiophenols.

*Example VI*

One hundred parts of a mixture of anthracene sulphides obtained by the reaction of anthracene and sulphur monochloride was charged into an autoclave together with 100 parts of benzene and 10 parts of a cobalt sulphide catalyst. Hydrogen was admitted to the autoclave to a pressure of 1900 lbs. per sq. in. and the autoclave agitated and heated at 150° C. for 3 hours. During this period the pressure decreased 600 lbs. per sq. in. After removing the catalyst from the solution, the benzene was evaporated and a solid mixture of anthracene sulphides and anthracene thiol was obtained.

*Example VII*

The processes of this invention are also applicable to aryl sulphides containing other functional groups attached to the aromatic ring. This is shown by the following experiment. Ninety parts of crude cresol sulphides obtained by the action of sulphur chloride on cresol was liquefied with 50 parts of benzene and charged into an autoclave with 10 parts of a cobalt sulphide catalyst prepared as described in Example I. The autoclave was charged with hydrogen to a pressure of 1800 lbs. per sq. in. and agitated and heated at 125° C. After one-half hour the pressure had dropped 600 lbs. per sq. in. No further absorption of hydrogen occurred during an additional hour of agitation. After cooling the autoclave, the contents were filtered from the catalyst and the benzene distilled from the product. Eighty-five parts of a liquid mixture of cresol thiols and cresol sulphides was thus obtained. Titration of an aliquot with standard iodine indicated the presence of 38 parts of thiol calculated as cresol thiol. Distillation of the product yielded a fraction boiling in the range from 80° to 100° C./2 mm. It was a white, low-melting solid mixture of isomeric cresol thiols.

*Example VIII*

Aryl monosulfides may likewise be cleaved by hydrogen to thiophenols as is shown by the following experiment. Seventy-five parts of phenothiazine dissolved in 75 parts of dioxane was hydrogenated in the presence of 10 parts of a cobalt sulphide catalyst at a temperature of 200° to 250° C. and at a hydrogen pressure of 1000 to 3000 lbs. per sq. in. in an agitated autoclave. The pressure drop was 800 lbs. per sq. in. in 4.5 hours, after which time the autoclave was cooled and the product separated from the catalyst by filtration. The product consisted of a mixture of o-thioldiphenylamine and diphenylamine, the formation of which is represented by the following equation:

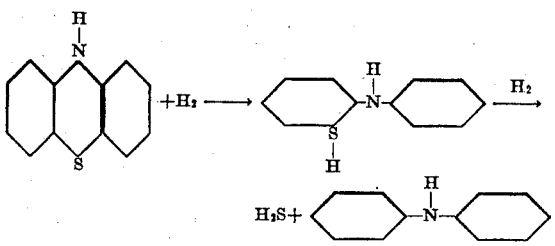

*Example IX*

Seventy-five parts of a solid polymeric naphthyl monosulphide resin and 100 parts of benzene were charged into a hydrogenation autoclave together with 5 parts of a precipitated cobalt polysulphide catalyst. The autoclave was filled with hydrogen to a pressure of 2000 lbs. per sq. in. and agitated and heated at 215° C. for 2 hours. After cooling the autoclave, the benzene solution of products was filtered to separate the catalyst. Fractional distillation to remove the benzene yielded 72 parts of a pale yellow oil consisting of a mixture of low molecular weight naphthyl sulphides and thionaphthols.

*Example X*

The catalytic hydrogenation of aromatic sulphides may also be carried out in conjunction with the hydrogen reduction of other groups. This is shown by the following experiment. Ninety-three parts of p,p'-dinitrodiphenyldisulphide was charged into an autoclave together with 75 parts of dioxane and 11 parts of a cobalt sulphide catalyst prepared by reacting hydrogen sulphide with pyrophoric finely divided metallic cobalt obtained by reducing cobalt chloride with a solution of sodium-naphthalene at room temperature. The autoclave was heated to 160° C. under a hydrogen pressure of 2500 lbs. per sq. in. The autoclave was agitated to insure intimate contact between catalyst and the solution. The absorption of hydrogen was very rapid, and it was necessary to add additional hydrogen from time to time to replace that absorbed. After one-half hour the total absorption of hydrogen was equivalent to a pressure drop of 3400 lbs. per sq. in. After this period the autoclave was cooled and the products filtered to remove the catalyst. By fractionation of the crude hydrogenation mixture pure p-aminothiophenol was obtained. Some aniline was also formed as a by-product. These transformations are illustrated by the following equations:

Broadly, the processes of this invention are applicable to the hydrogenation of organic sulphides containing an aromatic nucleus attached to sulphide sulphur as illustrated in the foregoing examples. As additional examples, may be mentioned sulphides derived from mononuclear aromatic hydrocarbons such as benzene, toluene, xylene, mesitylene, cumene, cymene, and, in general, alkyl or alkenyl benzenes. This invention is likewise applicable to the hydrogenation of aryl sulphides derived from polynuclear hydrocarbons such as sulphides of biphenyl, triphenyl, fluorene, indene, naphthalene, anthracene, phenanthrene, acenaphthene, acenaphthylene, tetralin, naphthacene, pyrene, triphenylene, chrysene, picene, and the like. Mixed aryl-alkyl sulphides (Ar—S$_x$—R where Ar represents an aryl radical and R represents an alkyl radical) may likewise be hydrogenated to thiophenols by the process of this invention.

Thiols are also obtained by the catalytic hydrogenation of aromatic compounds containing several different types of sulphur linkages. For example, the compounds which yield thiols according to this invention may be broadly represented by the formula Ar—S$_n$—Ar', where Ar and Ar' represent the same or different aromatic nuclei or substituted aromatic nuclei, and $n$ represents a whole number of 1 or greater. Examples of these sulphur linkages are the monosulphides such as Ar—S—Ar', disulphides as Ar—S$_2$—Ar', aromatic trisulphides as Ar—S$_3$—Ar' and, in general, polysulphides having the formula Ar—S$_x$—Ar'. The structure of the sulphur linkages containing more than one sulphur atom may be of several varieties. For example, disulphides that may be hydrogenated according to this invention may be in the form

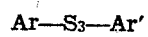

or Ar—S—S—Ar. Similarly, in the tri- and polysulphides, the sulphur atoms may be linked in a straight chain, or one or more of the sulphur atoms may be laterally bound to sulphur atoms in a chain. It has been found that aryl sulphides having at least two sulphur atoms linked in a chain between two aromatic nuclei can be hydrogenated to the corresponding thiols under milder conditions than are needed for the splitting of monosulphides.

In addition to simple sulphides such as have been described in the foregoing, the processes of this invention are also applicable to mixtures of aryl sulphides and also to aryl sulphides in which the aromatic nuclei contain other substituents in addition to sulphur. As examples of some of these may be mentioned aryl sulphides containing as substituent groups hydroxyl, amino, chloro, bromo, iodo, nitro, nitroso, and the like. As examples of such compounds may be mentioned monothioaniline, dithioaniline, phenol and cresol sulphides, nitrophenyl sulphides, and chloronaphthyl sulphides. The aryl sulphides may also contain such substituent groups as the carboxyl sulphonyl, sulphone chloride, or saturated or unsaturated hydrocarbon radicals. Examples of some of these which may be cited are sulphides of benzoic acid, cinnamic acid, styrene, and tolane. This invention is also applicable to the hydrogenation of sulphides derived from heterocyclic compounds that are substantially aromatic in character. As examples of these may be mentioned organic sulphides containing a pyrrole, furane, pyridine, quinoline, indole, diphenylene oxide, acridine, carbazole nucleus or the like.

The foregoing examples have illustrated certain conditions of temperature, pressure and reaction times that are suitable for the hydrogenation of aromatic sulphides to the corresponding thiols. Reaction conditions other than those illustrated may be employed; for example, temperatures from 75° to 300° C. are suitable. In general, however, it is preferred to use temperatures ranging from 100° to 200° C. for the conversion of aryl di- and polysulphides in which the sulphur atoms are in contiguous relation with respect to the carbon atoms and temperatures ranging from 175° to 300° C. for aryl monosulphides and aryl thiosulphides, e. g., compounds having the following structure

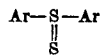

The pressure at which the hydrogenation may be carried out will depend primarily upon the equipment available and the speed with which it is desired to effect the reaction. Pressures ranging from atmospheric pressure upwards are suitable. In general, however, it is preferred to operate at pressures ranging from 100 to 3000 lbs. per sq. in. in order to avoid replacement of hydrogen in the gas space by any hydrogen sulphide generated in the reaction. Frequently the reaction proceeds at a greater rate at the higher pressures. Generally, it is preferred to allow the hydrogenation process to continue until no more hydrogen is absorbed. However, it may be desirable to interrupt the hydrogenation before hydrogen absorption ceases, particularly when hydrogenating monosulphides to thiols in order to prevent the secondary reaction of cleavage of thiols to hydrocarbons.

The aryl sulphides to be hydrogenated are conveniently dissolved in an inert organic solvent as, for example, hydrocarbons, alcohols, ethers, and the like. Other substances such as acids, anhydrides, esters, amines, etc., may also be present if desired. However, it is not essential that a solvent be used, and the hydrogenation process can be carried out effectively in the absence of a solvent provided that the sulphide mixture melts at a temperature below the desired hydrogenation temperature. It is preferred to operate in the liquid phase due to the low volatility of the aryl sulphides.

The foregoing examples have illustrated the use of a number of sulphactive catalysts for effecting the hydrogenation of aryl sulphides to thiophenols. However, the process is not limited to these particular catalysts and other sulphactive catalysts may be used as well. In general, metal sulphides are the preferred class of catalysts since these are not poisoned by sulphur compounds. As examples of such sulphides may be mentioned sulphides of the common hydrogenating metals such as iron, nickel, cobalt, copper, silver, lead, chromium, molybdenum, palladium, tungsten, or combinations of sulphides of these metals; e. g., cobalt-nickel sulphide, cobalt-molybdenum sulphide, chromium-molybdenum sulphide, tungsten-molybdenum sulphide, and the like. It is preferred to use sulphides of cobalt, nickel, iron and molybdenum since these are generally more active. These metal sulphide catalysts may be prepared by precipitation methods or by treating the metals or metal compounds with volatile sulphiding agents such as sulphur, hydrogen sulphide, carbon bisulphide and the like at ordinary or elevated temperatures. Still other methods for preparing hydrogenation catalysts may be employed. The metal sulphide catalyst may be charged into the reaction vessel as such or formed in situ as has been illustrated in the foregoing examples by charging the free metal or a metal compound with an equivalent amount of sulphiding agent. The catalysts may be used in a substantially pure state, or they may be admixed with other materials. For example, the catalyst may be supported on a carrier such as kieselguhr, alumina, magnesia, silica gel, and the like. It is preferred to use the catalyst in a finely divided condition, but if a continuous hydrogenation process is to be operated, then the catalyst should be in the form of suitable briquets or lumps. The amount of catalyst used may be varied considerably. In general, an amount which will bring about the completion of the hydrogenation reaction in a practicable length of time will be from 1 to 20% by weight of the total sulphide charged. Other amounts, however, may be used, depending upon the activity of the particular catalyst employed.

While it is preferred to use hydrogen gas in substantially pure form for the reducing agent, hydrogen admixed with other gases or vapors as, for example, nitrogen, carbon monoxide, hydrocarbons, hydrogen sulphide, and the like is suitable.

This invention is useful primarily for the preparation of aromatic thiols. These thiols have a number of important industrial uses as such or as intermediates in the preparation of other valuable compounds. Another use of the invention is to change the physical and chemical character of aryl sulphide resins. For example, the hydrogenation of certain resinous mixtures of aryl sulphides yields products having less color, lower molecular weight, and in general greater solubility than the original resin. Aryl sulphides have heretofore been regarded as chemically refractory materials and this invention therefore opens up a brand new field of usefulness for aryl sulphides. By a combination of sulphurization and hydrogenation a new method has been provided for introducing functionality into hydrocarbon raw materials.

This invention constitutes a great improvement over prior processes for reducing aryl sulphides to thiophenols. It constitutes a simple and direct catalytic process for effecting this reduction so as to obtain the corresponding thiophenols in high yields and in a high degree of purity. Generally the thiols can be isolated by simple filtration and distillation operations. The products obtained are light colored and ready for commercial use.

It is apparent that many widely different embodiments of this invention may be made without departing from the spirit and scope thereof and therefore the invention is not intended to be lim-

I claim:

1. The process which comprises bringing an aryl sulphide and hydrogen into contact with a sulphactive hydrogenation catalyst at a temperature between 75° and 300° C.

2. The process which comprises bringing an aryl monosulphide and hydrogen into contact with a sulphactive hydrogenation catalyst at a temperature between 75° and 300° C.

3. The process which comprises bringing an aryl polysulphide and hydrogen into contact with a sulphactive hydrogenation catalyst at a temperature between 75° and 300° C.

4. The process which comprises bringing an aryl sulphide having at least two sulphur atoms in a chain and hydrogen into contact with a sulphactive hydrogenation catalyst at a temperature between 75° and 300° C.

5. The process which comprises bringing an aryl polysulphide and hydrogen into contact with a sulphactive hydrogenation catalyst at a temperature of 100° to 200° C.

6. The process which comprises bringing an aryl monosulphide and hydrogen into contact with a sulphactive hydrogenation catalyst at a temperature of 175° to 300° C.

7. The process of claim 3 in which the aryl polysulphide is one having at least two sulphur atoms in contiguous relation between the aryl groups.

8. The process which comprises bringing an aryl sulphide and hydrogen into contact with a sulphactive hydrogenation catalyst at a temperature between 75° and 300° C. and at a pressure within the range of 100 to 3000 lbs. per sq. in.

9. The process for the preparation of thiols which comprises catalytically hydrogenating an aryl sulphide in the liquid phase while in contact with a sulphactive hydrogenation catalyst.

10. The process in accordance with claim 8 characterized in that the reaction is carried out in the presence of an inert organic solvent.

11. The process in accordance with claim 1 characterized in that the catalyst is a sulphactive metal sulphide.

12. The process in accordance with claim 1 characterized in that the catalyst is a sulphactive base metal sulphide.

13. The process in accordance with claim 1 characterized in that the catalyst is a sulphide selected from the group consisting of iron, nickel, cobalt, and molybdenum.

14. The process which comprises bringing an aryl polysulphide and hydrogen into contact with a sulphide selected from the group consisting of iron, nickel, cobalt, and molybdenum at a temperature between 100° and 200° C. under a pressure of 100 to 3000 lbs. per sq. in.

15. The process which comprises bringing an aryl monosulphide and hydrogen into contact with a sulphide selected from the group consisting of iron, nickel, cobalt, and molybdenum at a temperature between 175° and 300° C. and at a pressure of 100 to 3000 lbs. per sq. in.

16. The process of claim 1 in which the aryl sulphide is a naphthyl sulphide.

17. The process of claim 1 in which the aryl sulphide is a xylyl sulphide.

18. The process which comprises bringing a naphthyl polysulphide and hydrogen into contact with a sulphactive hydrogenation catalyst at a temperature between 75° and 300° C.

19. The process which comprises bringing a xylyl polysulphide and hydrogen into contact with a sulphactive hydrogenation catalyst at a temperature between 75° and 300° C.

20. A composition of sulphur derivatives of xylene containing 17 to 27% of total sulphur and 5 to 23% of thiol sulphur and having a ratio of total sulphur to thiol sulphur of at least 1.1.

21. A composition of sulphur derivatives of cresol containing from 14 to 30% of total sulphur and from 5 to 23% of thiol sulphur and having a ratio of total sulphur to thiol sulphur of at least 1.1.

22. The process which comprises bringing an aryl sulphide and hydrogen into contact with a sulphactive hydrogenation catalyst at a temperature between 75° and 300° C., said aryl sulphide containing in addition to carbon, hydrogen, and sulphur substituent atoms selected from the classes of oxygen, nitrogen and halogen.

23. The process of claim 22 in which the aryl sulphide is an oxygen containing aryl sulphide.

24. The process of claim 22 in which the aryl sulphide is a nitrogen containing aryl sulphide.

25. The process of claim 22 in which the aryl sulphide is a halogen containing aryl sulphide.

26. The process which comprises bringing an aryl sulphide and hydrogen into contact with a sulphactive hydrogenation catalyst at a temperature between 75° and 300° C., said sulphactive hydrogenation catalyst being one obtained by precipitation.

27. The process which comprises bringing an aryl sulphide and hydrogen into contact with a sulphactive hydrogenation catalyst at a temperature between 75° and 300° C., said sulphactive hydrogenation catalyst being one obtained by treating a substance selected from the group comprising metals and metal compounds with a volatile sulphur compound.

28. The process which comprises bringing an aryl sulphide and hydrogen into contact with a sulphactive hydrogenation catalyst at a temperature between 75° and 300° C., said sulphactive hydrogenation catalyst being one obtained by treating a pyrophoric hydrogenating metal with a volatile sulphur compound.

29. The process of claim 28 in which the pyrophoric metal is obtained by reducing an oxygen containing metal compound with hydrogen.

30. The process of claim 28 in which the pyrophoric metal is obtained by reacting a metal salt with a solution of sodium-naphthalene and then separating the precipitated metal from the reaction mixture.

31. The process of claim 28 in which the pyrophoric metal is obtained by treating an aluminum alloy of said metal with a solution of sodium hydroxide.

32. The process which comprises bringing an aryl sulphide and hydrogen into contact with a sulphactive hydrogenation catalyst at a temperature between 75° and 300° C., said sulphactive hydrogenation catalyst being one obtained by treating with a volatile sulphur compound a pyrophoric metal obtained by reducing an oxygen containing metal compound with hydrogen and subsequently stabilizing by exposure to an oxidizing atmosphere at a temperature below 50° C. before sulphidation.

33. The process which comprises bringing an aryl sulphide and hydrogen into contact with a sulphactive hydrogenation catalyst at a temperature between 75° and 300° C., said sulphactive hydrogenation catalyst being prepared by treating with a volatile sulphur compound a pyrophoric metal obtained by reacting a metal salt with a solution of sodium-naphthalene and then separating the precipitated metal from the reaction mixture and stabilizing by exposure to an oxidizing atmosphere at a temperature below 50° C. before sulphidation.

34. The process which comprises bringing an aryl sulphide and hydrogen into contact with a sulphactive hydrogenation catalyst at a temperature between 75° and 300° C., said sulphactive hydrogenation catalyst being one obtained by treating with a volatile sulphur compound a pyrophoric metal obtained by treating an aluminum alloy of said metal with a solution of sodium hydroxide and subsequently stabilizing by exposure to an oxidizing atmosphere at a temperature below 50° C. before sulphidation.

35. The process which comprises bringing an aryl sulphide and hydrogen into contact with a sulphactive hydrogenation catalyst at a temperature between 75° and 300° C., said sulphactive hydrogenation catalyst being one obtained by treating a precipitated metal polysulphide with hydrogen at a temperature between 50° and 300° C.

36. The process in accordance with claim 8 characterized in that the reaction is carried out in the presence of an inert aromatic hydrocarbon solvent.

37. The process in accordance with claim 27 characterized in that the sulphactive hydrogenation catalyst is formed in situ by exposing nickel in the elementary state to the action of an organic sulphur compound.

38. The process of claim 1 in which the aryl sulphide is a cresol sulphide.

FRANK KERR SIGNAIGO.